UNITED STATES PATENT OFFICE.

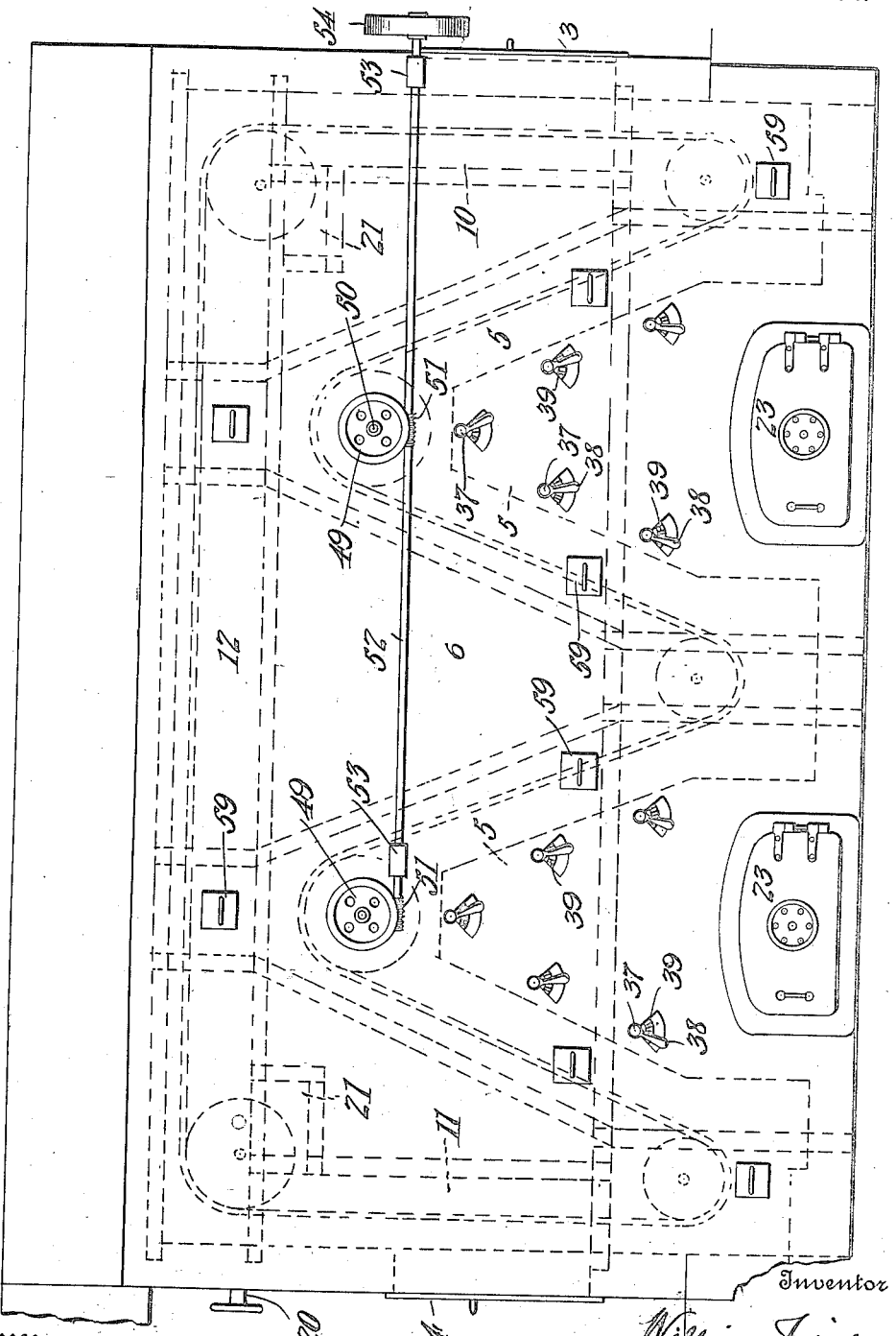

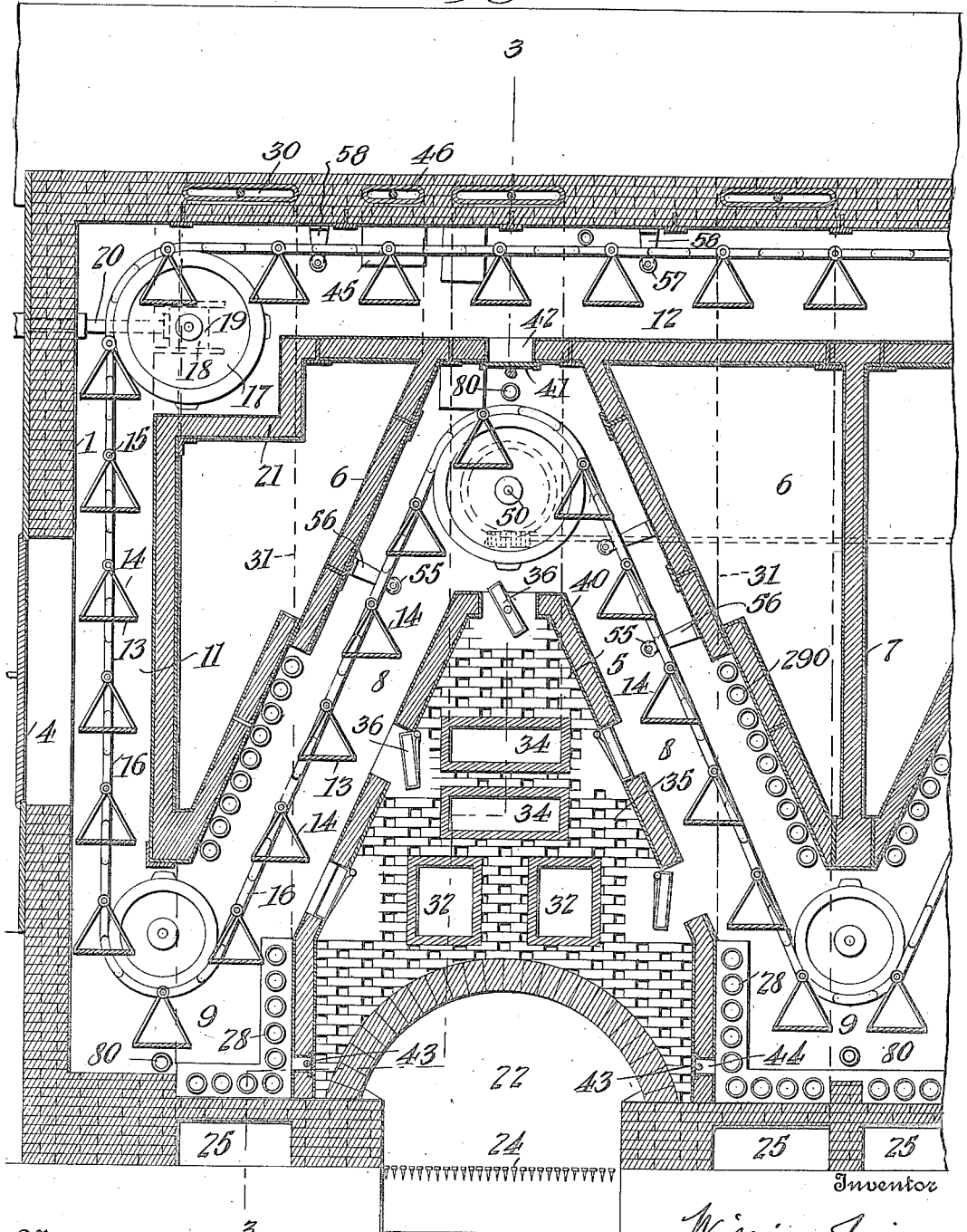

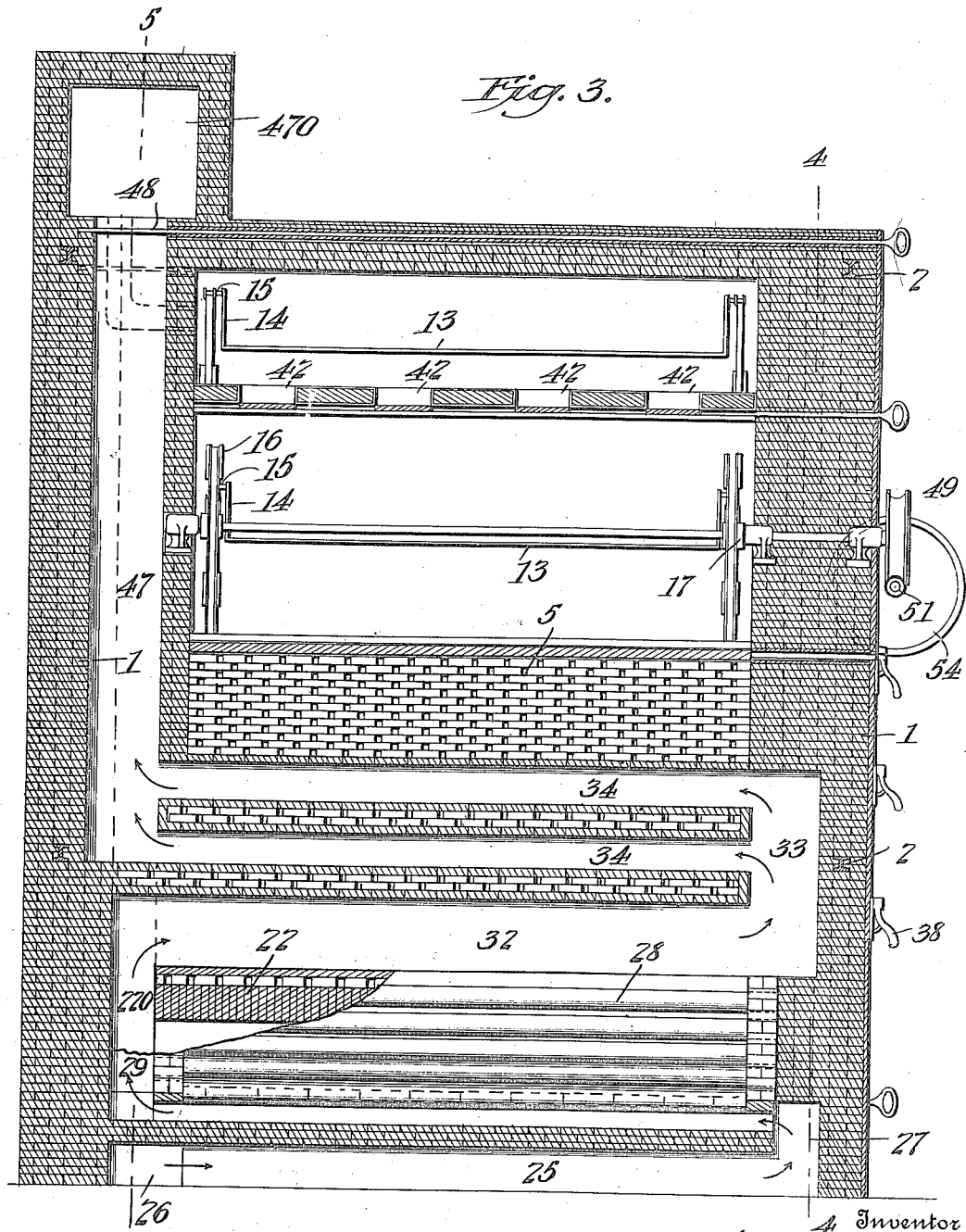

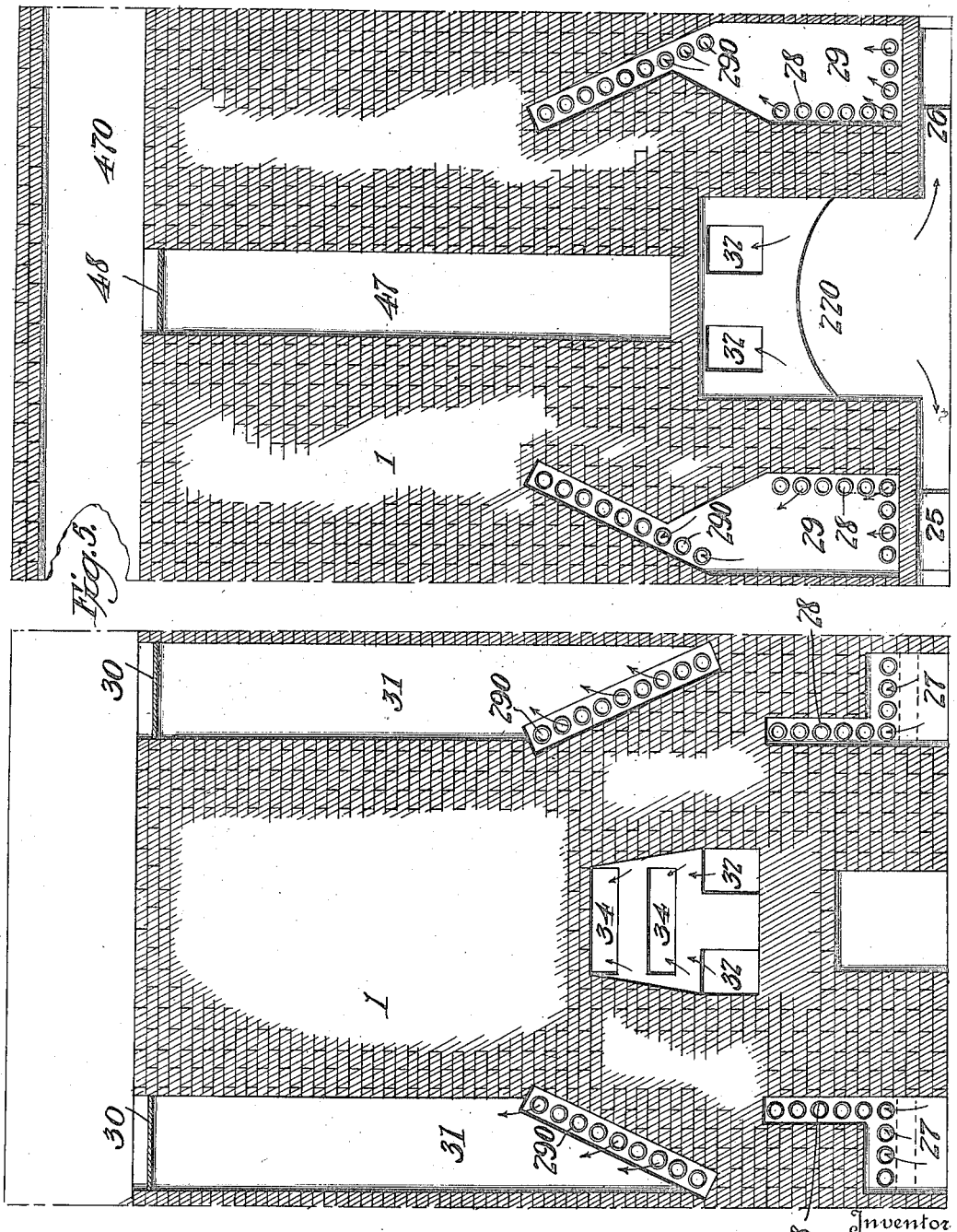

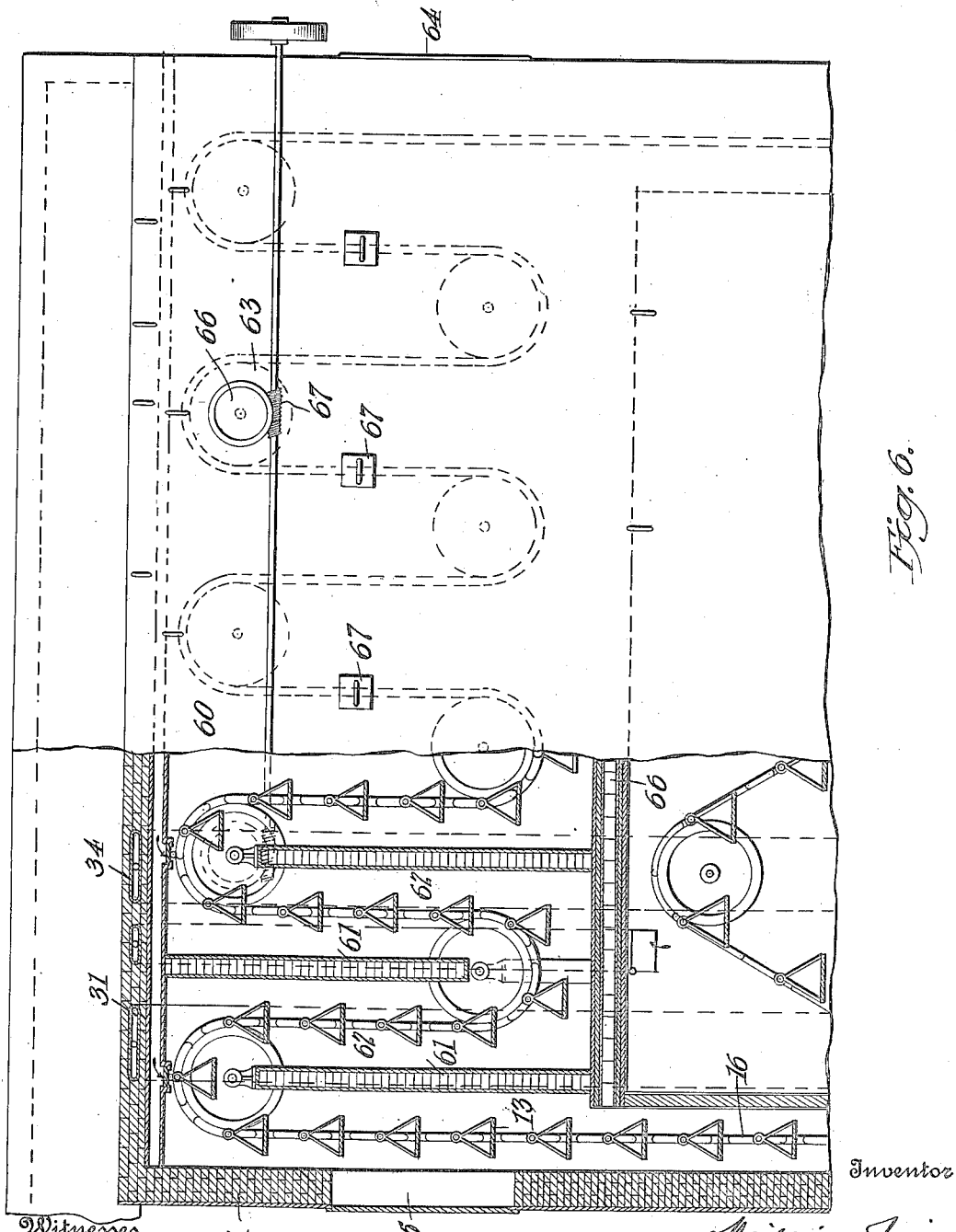

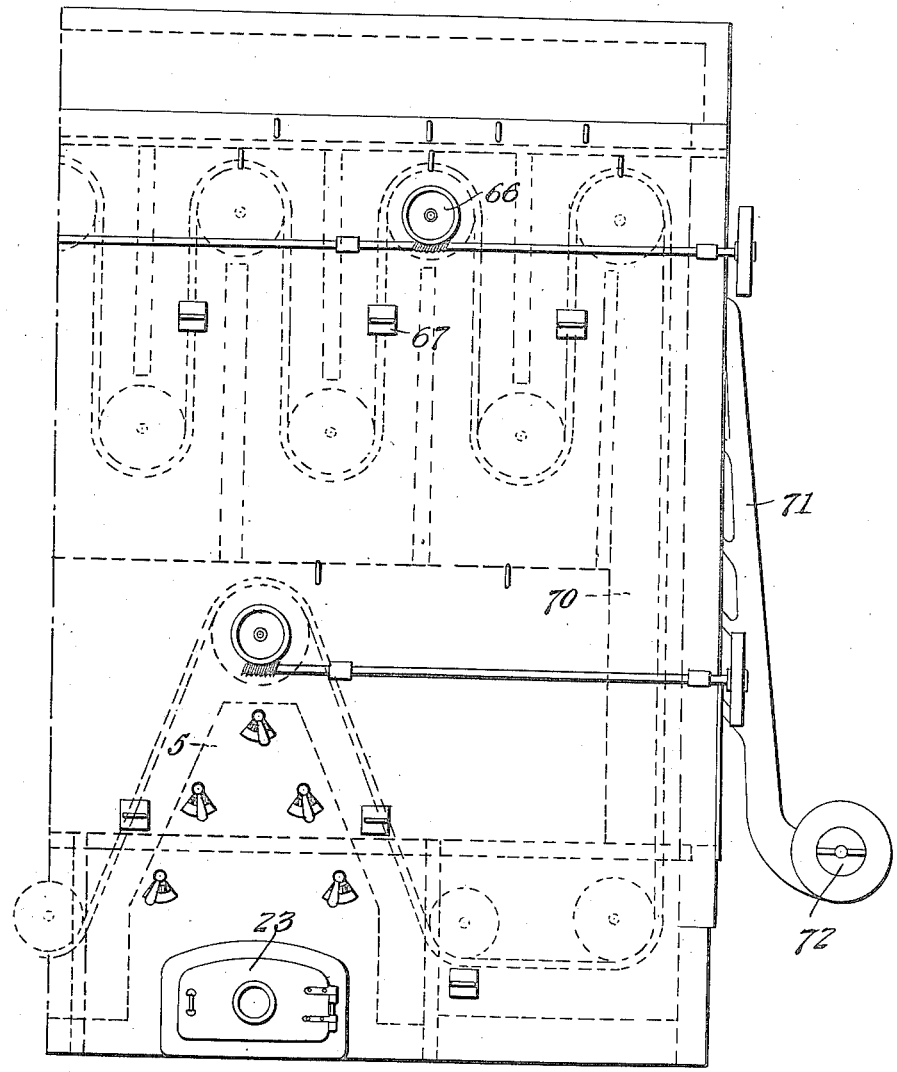

WILLIAM FISCH, OF BIRMINGHAM, ALABAMA.

BAKING-OVEN.

1,254,318.

Specification of Letters Patent.

Patented Jan. 22, 1918.

Application filed May 21, 1914. Serial No. 839,970.

*To all whom it may concern:*

Be it known that I, WILLIAM FISCH, a citizen of the United States, residing at Birmingham, in the county of Jefferson and State of Alabama, have invented certain new and useful Improvements in Baking-Ovens; and I do hereby declare the following to be a full, clear, and exact description of the invention, such as will enable others skilled in the art to which it appertains to make and use the same.

My invention relates to ovens and especially to ovens for baking breads, cakes, pies and crackers.

Its object is to provide a sectional oven with a series of shelves or trays continuously traveling through the various sections of the oven so that the trays may be readily charged and discharged and a large amount of bread be uniformly baked. I have provided for maintaining an even and appropriate baking temperature at every stage of the progress and for cooling or moistening the air in any section when desired, and for so presenting the bread to the heat as to secure as good results on a large scale with my oven as can be had on a small scale with the ordinary ovens. I am also enabled without especially dividing the oven into separate sections, to maintain, if necessary, different temperatures in different sections.

To this end my invention comprises the combinations of mechanism set forth in the appended claims.

In the drawings Figure 1 is a front elevation of my improved oven with the interior construction illustrated in dotted lines;

Fig. 2 is a central vertical longitudinal section of approximately one half of the oven illustrated in Fig. 1;

Fig. 3 is a vertical transverse sectional view on the staggered line 3—3 of Fig. 2 with part broken away to show the relative location of the furnace;

Fig. 4 is a vertical section on the line 4—4 of Fig. 3;

Fig. 5 is a vertical section on the line 5—5 of Fig. 3;

Fig. 6 is a combined partial section and front elevation to show the location of the proof room; and Fig. 7 is a partial front elevation to show the arrangement of the additional cooling room or shaft and its relation to the oven and proof room.

In the drawings 1 represents the exterior wall of the oven, which may be composed of a suitable metal casing insulated with fire-brick and strengthened with I-beams 2, as shown, for example, in Fig. 3 of the drawings. At opposite ends of the oven are doors 3 and 4 for the purpose of charging and discharging. Within each section of the oven is built up a pyramidal structure 5 and a corresponding heat storing triangular structure 6. The triangular structures give the effect of depending from the upper part of the oven chamber and are put back to back in the respective sections of the oven with intervening walls 7.

These are, therefore, a series of pyramidal heating structures and a series of inverted radiating structures, taking the oven as a whole, and between these are inclined ways 8 which meet at the top and which are joined at the bottom by intervening horizontal ways or chambers 9. There are also at opposite ends of the oven vertical ways 10 and 11, and extending across the oven at the top, a horizontal way 12.

Through these ways or channels travel a series of trays 13, each swung from divergent arms 14 pivoted to rods or shafts 15, each rod or shaft being carried by an endless sprocket chain 16 traveling over the sprocket wheels 17, the sprocket wheels being driven by suitable power from any preferred source.

In the drawings, by reference to Fig. 2, it will be seen that there is illustrated in the upper left-hand corner an adjusting means 18 for this sprocket wheel for the purpose of taking up the slack. This means consists of an ordinary channel box 19 and adjusting rod 20. Any one of various common adjusting means may be employed for this purpose, the one shown being a simple and feasible device. It will be observed that the upper corner of the triangular structure 6 is cut away as at 21 for the purpose of permitting a sidewise movement or adjustment, if necessary, of the sprocket wheel just described. An adjustment device may be applied also, and preferably will be applied, to the sprocket wheel at the opposite end.

The structures as thus far described provide for the constant traveling of a series of trays through a series of sections of the oven, any section of which, as will be seen, may have its heat separately regulated, and provide also for a long, continuous travel through a substantially uniform temperature and under uniform conditions as the bread passes, for example, up the channel 11, across the channel 12 and down the channel 10.

22 represents a plurality of furnaces. In this instance there are two illustrated but it is obvious that any number of these furnaces may be provided and a corresponding number of pyramidal sections 5 and 6 located above them for the purpose of increasing the size and capacity of the ovens. The furnaces 22 are provided with doors 23 and grates 24.

Located on each side of each furnace 22 is a horizontal flue 25 which communicates with the furnace at its rear end by means of a lateral passage 26. In the figures of the drawing a furnace and an oven are shown in substantially central section in Fig. 2. In Fig. 3 the oven and furnace are shown on the line 3—3 running through Fig. 2. In Figs. 4 and 5 there are shown respectively sections on lines 4—4 and 5—5 of Fig. 3, that is, Fig. 4 is a central vertical section through the front wall, while Fig. 5 is through the rear wall.

I propose to have the direct products of combustion go back to the rear first, then return front, then again to the rear, and finally discharge through the chimney governed by dampers. The lateral passage 26 communicates with a rear chamber 220 of the furnace. At the forward end of the passage 25 is an upwardly extending passage 27 which communicates with a series of horizontal pipe flues 28. That is to say, the products of combustion so far will come from the rear through the passage 25, up the passage 27 into the pipe flues 28, as indicated by the arrows, flowing through them again to the rear where through a passage 29 they communicate with a set of pipe flues 290. These flues bring the products of combustion forward again and discharge them into the flue 31 which communicates with the chimney controlled by the damper 30. The ends of the pipe flues 290 are shown as leading into the bottom of the flue 31 and are also shown in an angular relation. This arrangement enables me to get a larger number of pipes discharging at substantially the same point in the flue.

The chamber 220 is in direct communication with horizontal flues 32 located above the furnaces 22; and by means of a short vertical passage 33, the said flue 32 communicates with a plurality of superimposed horizontal flues 34. These flues 32, 33 and 34 are located within a pyramidal member 5, that member being composed of honeycombed brickwork 35 in which the heat of radiation from the furnaces and the flues 32, 33, 34 is stored up and permitted to pass into the baking chamber through the medium of pivoted dampers 36. These dampers are provided with pivotal members in the shape of rods 37 which extend through the front wall of the oven and are provided with operating handles 38 held in adjusted position by toothed segments 39. The honeycombed brick-work of the pyramidal members 5 is entirely inclosed within an insulated casing 40 which effectually prevents the escape of the heat into the baking chamber except through the medium of the dampers 36 so that the amount of heat thus admitted may be readily controlled.

Located at the apex of the inclined ways 8 is a damper 41 which controls a series of passages 42 leading into the passage 12. A similar damper 43 is located on each side of the oven, at the lower end of the pyramidal section 5 which controls the escape of heat through the passage 44 into the portion 9 of the baking chamber.

Heat within the passage 12 is also controlled through the flue 45 which is regulated by the damper 46. At the rear of the oven there is a vertical flue 47 which communicates with a common horizontal flue 48 which acts to carry off the waste heat and products of combustion.

It will be understood from the preceding description that the chamber 220 at the rear of the furnaces feeds directly to passages 32 the products of combustion. That is, the products of combustion come from the rear of the furnace through the flues 32 to the front, here they rise through the passage 33 and then return through the flues 34 to the chimney flue 47 guarded by a damper 48 at the top. All of the flues 47 are connected by a horizontal passage-way 470 with a common chimney.

As has been stated, any means may be used to drive the sprocket wheel 17 over which the chain 16 passes, but by reference to Fig. 1 of the drawings it will be seen that there is provided for this purpose a worm gear 49 located upon the outer end of the shaft 50 which carries one of the sprocket wheels 17. This worm gear 49 engages the worm 51 mounted on the shaft 52 carried in bearings 53 upon the front wall of the oven, said shaft being driven over a pulley 54.

In order to prevent the chain 16 from sagging and possibly coming in contact with the walls of the passages through which it passes, there is provided in the inclined ways 8 a plurality of supporting rollers 55. These rollers are carried by brackets 56 suspended from the walls of the inverted pyramidal members 6. Similar rollers 57 carried by brackets 58 are suspended from the top wall of the passage 12.

Suitable manholes 59 are provided in the front wall of the furnaces so that ready access may be had to the different parts of the baking chamber and the passage 12.

In the modification shown in Fig. 6 the construction of the oven proper remains the same as that just described, but located above the oven is a proof room 60. When this proof room is used it is built into and forms a part of the oven. It comprises a horizontal chamber provided with a series of partitions 61 arranged in staggered relation. These partitions abut or adjoin the lower and upper walls of the proof room and are so arranged that the passages 62 formed thereby are in communication with one another owing to the fact that the end of the partition opposite that which adjoins the wall of the proof room, stops before reaching the opposite wall. Located at the point of communication of the passages 62 is a sprocket 63 over which the chain 16 of the baking chamber is adapted to pass. This chain 16 is identical with the one previously described and carries the usual pivoted shelves 13.

It is necessary to effectually insulate the proof room from the baking chamber, and in order to do this a heavily insulated wall 66 is provided therebetween so that the heat will be prevented from coming through this partition.

The oven will usually carry a temperature of from 40° to 600° Fahrenheit while the temperature of the proof room will never go over 100° Fahrenheit. The proof room is supplied with an independent heating system and the temperature automatically maintained at a uniform degree.

Worm wheels 66 and worm gears 67 similar to the wheels 50 and gears 51 are used to aid in driving the sprocket wheel 63. Manholes 67 are also provided to permit access to the proof room.

In Fig. 7 I have shown a part of the proof room and a unit of the furnace and oven in relation and at the side a cooling device by which, when desired, the chains 16 and shelves 13 may be cooled before the articles to be proofed and baked are placed upon them. To this end I provide a shaft 70 in one side of the structure. With the shaft 70 communicates the branches of an in-feed air pipe 71 supplied by a blower 72. I have also provided a series of moistening pipes 80 which I may place throughout the apparatus as especially indicated in Fig. 2. These are supplied with steam from any suitable source and may be regulated in any appropriate manner by a valve or cock.

I claim:—

1. In a baking oven, the combination with an endless carrier and a series of pivoted trays or shelves borne by the carrier, of a series of sections each comprising a furnace, opposing heat-storing structures, intervening hot-air passages, in which the carrier is adapted to travel and valved openings through the walls of the heat-storing structures leading into the passages.

2. In a baking oven, comprising a series of sections, the combination of a furnace, a heat-storing structure receiving heat from the furnace, non-conducting walls on the sides of the heat-storing structure, valved openings through the walls, and means for carrying the material to be baked through the sections of the oven.

3. In a baking oven, the combination of a furnace, a superimposed honey-combed heat-storing structure, a second heat-storing structure, intervening passages, heating flues leading from the furnace to the second heat-storing structure, and means for governing the discharge of heat from the first named heat-storing structures into the passages.

4. In a baking oven, the combination with an endless carrier, of a series of communicating sections with means for independently heating each section to a desired temperature while at the same time maintaining communication between the sections, the series of communicating sections comprising upright side passages connected overhead by a horizontal passage.

5. In a baking oven comprising a series of sections, the combination in each section with a pyramidal heat-storing and distributing structure, of complemental heat-storing and distributing structures arranged to form passages in each section.

6. In a baking oven, the combination of a series of pyramidal heat-storing structures, vertical passages at each end of the oven, a communicating horizontal passage at the top, and means for carrying articles about the heat-storing structures and through the passages.

7. In a baking oven, the combination of a baking section, a proof room adjoining the baking section, an intermediate cooling shaft and means for carrying articles traveling through the baking section, the cooling shaft and the proof room.

8. In a baking oven, the combination with passages for the articles, of a pyramidal section having insulated walls and an inclosed heat-storing structure having valves in the walls.

9. In a baking oven, the combination of a passage formed of a series of communicating passages, a heat storing chamber between adjacent sections of the passage, upright and overhead passages surrounding the heat storing chamber, means for controlling the delivery of heat from each heat storing chamber to its adjacent section of the passage and means for regulating the temperature in each passage.

In testimony whereof I have hereunto signed my name in the presence of two subscribing witnesses.

WILLIAM FISCH.

Witnesses:
  FANCHON ARMSTRONG,
  W. C. HAMILTON.